US008977956B2

(12) United States Patent
Ahmadullin et al.

(10) Patent No.: US 8,977,956 B2
(45) Date of Patent: Mar. 10, 2015

(54) DOCUMENT AESTHETICS EVALUATION

(75) Inventors: Ildus Ahmadullin, Mountain View, CA (US); Niranjan Damera Venkata, Tamil Nadu (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 345 days.

(21) Appl. No.: 13/349,947

(22) Filed: Jan. 13, 2012

(65) Prior Publication Data
US 2013/0185630 A1   Jul. 18, 2013

(51) Int. Cl.
*G06F 17/21* (2006.01)
*G06F 17/24* (2006.01)
*G06Q 50/00* (2012.01)

(52) U.S. Cl.
CPC ............ *G06F 17/212* (2013.01); *G06F 17/248* (2013.01); *G06Q 50/00* (2013.01)
USPC ........................................................ 715/243

(58) Field of Classification Search
CPC .................................................... G06F 17/212
USPC ................................. 715/273, 243
See application file for complete search history.

(56) References Cited

U.S. PATENT DOCUMENTS

| 7,434,159 | B1* | 10/2008 | Lin ................................ 715/243 |
| 7,451,140 | B2 | 11/2008 | Purvis et al. |
| 7,788,579 | B2* | 8/2010 | Berkner et al. ............... 715/243 |
| 8,429,517 | B1* | 4/2013 | Damera-Venkata et al. . 715/205 |
| 2002/0059339 | A1* | 5/2002 | McCormick et al. ...... 707/500.1 |
| 2004/0019847 | A1* | 1/2004 | Purvis ........................... 715/500 |
| 2004/0019850 | A1* | 1/2004 | Purvis et al. ................... 715/517 |
| 2004/0019851 | A1* | 1/2004 | Purvis et al. ................... 715/517 |
| 2004/0024613 | A1* | 2/2004 | Harrngton et al. ................ 705/2 |
| 2004/0025109 | A1* | 2/2004 | Harrington et al. ........... 715/500 |
| 2004/0205643 | A1* | 10/2004 | Harrington .................... 715/530 |
| 2005/0028074 | A1* | 2/2005 | Harrington et al. ........... 715/500 |
| 2005/0028075 | A1* | 2/2005 | Harrington et al. ........... 715/500 |
| 2005/0028076 | A1* | 2/2005 | Harrington et al. ........... 715/500 |
| 2005/0028096 | A1* | 2/2005 | Harrington et al. ........... 715/530 |
| 2005/0028097 | A1* | 2/2005 | Harrington et al. ........... 715/530 |
| 2005/0028098 | A1* | 2/2005 | Harrington et al. ........... 715/530 |
| 2005/0028099 | A1* | 2/2005 | Harrington et al. ........... 715/530 |
| 2005/0071743 | A1* | 3/2005 | Harrington et al. ........... 715/500 |
| 2005/0144029 | A1* | 6/2005 | Rakowski et al. ................ 705/1 |
| 2005/0154980 | A1* | 7/2005 | Purvis et al. ................... 715/513 |
| 2006/0155699 | A1* | 7/2006 | Purvis et al. ....................... 707/6 |
| 2006/0248071 | A1* | 11/2006 | Campbell et al. .................. 707/5 |
| 2007/0079236 | A1* | 4/2007 | Schrier et al. ................. 715/517 |
| 2007/0133842 | A1* | 6/2007 | Harrington .................... 382/112 |
| 2007/0180363 | A1* | 8/2007 | Dance ............................ 715/517 |

(Continued)

OTHER PUBLICATIONS

Harrington et al., Aesthetic Measures for Automated Document Layout, ACM, DocEng '04, 2004, p. 109-111.*

(Continued)

*Primary Examiner* — Frank D Mills

(57) ABSTRACT

In one implementation, a document aesthetics evaluation system accesses a plurality of content layout descriptors associated with a document template and a plurality of aesthetics measures. Each aesthetics measure from the plurality of aesthetics measures being assigned by a designer to a content layout descriptor from the plurality of content layout descriptors. The document aesthetics evaluation system also defines a content layout model for the document template based on the plurality of content layout descriptors and the plurality of aesthetics measures.

27 Claims, 7 Drawing Sheets

(56) References Cited

U.S. PATENT DOCUMENTS

| | | | | |
|---|---|---|---|---|
| 2007/0208996 | A1* | 9/2007 | Berkner et al. | 715/521 |
| 2008/0022197 | A1* | 1/2008 | Bargeron et al. | 715/246 |
| 2009/0161916 | A1* | 6/2009 | Ma | 382/112 |
| 2009/0228328 | A1* | 9/2009 | Cagan et al. | 705/10 |
| 2009/0254813 | A1* | 10/2009 | Kobayashi | 715/243 |
| 2009/0254814 | A1* | 10/2009 | Lai et al. | 715/244 |
| 2010/0195124 | A1* | 8/2010 | Has | 358/1.9 |
| 2011/0055687 | A1* | 3/2011 | Bhandar et al. | 715/235 |
| 2011/0231754 | A1* | 9/2011 | Campbell et al. | 715/249 |
| 2011/0289407 | A1* | 11/2011 | Naik et al. | 715/269 |
| 2012/0204098 | A1* | 8/2012 | Venkata | 715/243 |
| 2012/0204100 | A1* | 8/2012 | Damera-Venkata | 715/244 |
| 2012/0304042 | A1* | 11/2012 | Pereira et al. | 715/201 |
| 2013/0014008 | A1* | 1/2013 | Damera-Venkata | 715/252 |
| 2013/0124979 | A1* | 5/2013 | Chang et al. | 715/243 |
| 2013/0185632 | A1* | 7/2013 | Damera-Venkata | 715/243 |
| 2013/0205199 | A1* | 8/2013 | Damera-Venkata | 715/243 |
| 2013/0212471 | A1* | 8/2013 | Damera-Venkata | 715/243 |
| 2013/0298012 | A1* | 11/2013 | Slatter et al. | 715/243 |
| 2014/0173397 | A1* | 6/2014 | Pereira et al. | 715/202 |

OTHER PUBLICATIONS

Purvis et al., Creating Personalized Documents: An Optimization Approach, ACM, DocEng '03, 2003, p. 68-77.*

Faria et al., Measuring Aesthetic Distance Between Document Templates and Instances, ACM, DocEng '06, 2006, p. 13-21.*

Damera-Venkata et al., Probablistic Document Model for Automated Document Composition, ACM, DoCEng '11, Sep. 19-22, 2011, p. 3-12.*

Borning, Alan, Richard Kuang-Hsu Lin, and Kim Marriott. "Constraint-based document layout for the Web." Multimedia systems 8, No. 3 (2000): 177-189.*

Damera-Venkata, Niranjan, José Bento, and Eamonn O'Brien-Strain. "Probabilistic document model for automated document composition." In Proceedings of the 11th ACM symposium on Document engineering, pp. 3-12. ACM, 2011.*

Chaudhury, S. et al., Model-guided Segmentation and Layout Labelling of Document Images Using a Hierarchical Conditional Random Field, (Research Paper), Proceedings of the 3rd International Conference on Pattern Recognition and Machine Intelligence, 2009, pp. 375-380, vol. 5909.

* cited by examiner

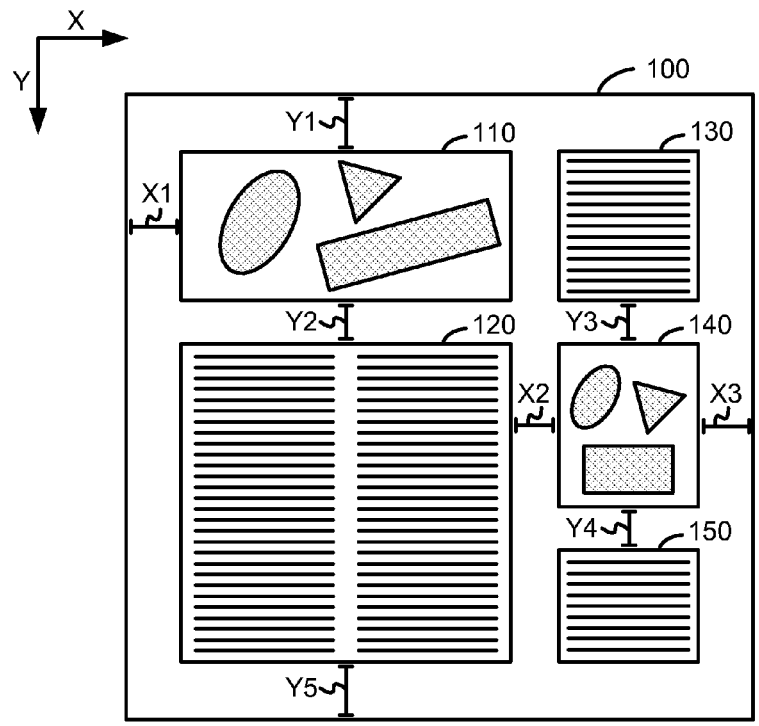
FIG. 1A
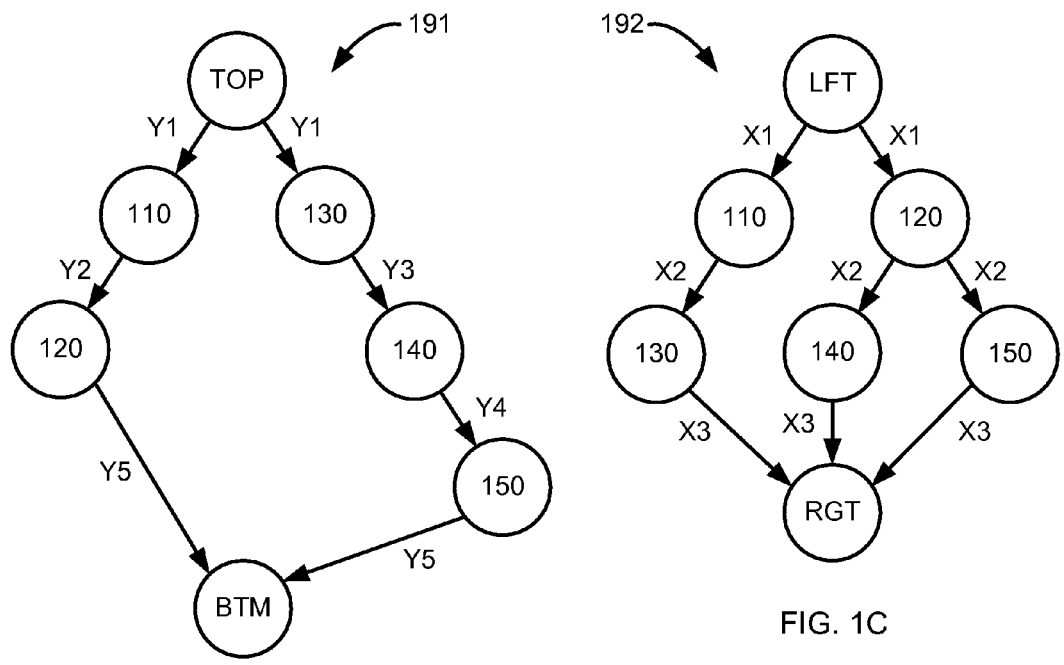
FIG. 1B
FIG. 1C

DOCUMENT AESTHETICS EVALUATION

BACKGROUND

Aesthetics evaluation of the content layout of a document is typically performed by a person such as a designer. For example, after content has been arranged within a document, a designer reviews the document to determine whether the content layout of the document (or the document itself) is aesthetically pleasing.

In addition to designer-based aesthetics evaluation of content layout, automated (e.g., computer-based rather than human-based) content layout evaluation systems have been proposed. Such automated content layout evaluation systems typically attempt to identify the extent to which the content layout of a document conforms to design principles (e.g., alignment, regularity, separation, balance, uniformity, proportionality, and flow) or to measure deviation of the content layout of a document from an ideal document template.

BRIEF DESCRIPTION OF THE DRAWINGS

FIG. 1A is an illustration of the content layout of a document, according to an implementation.

FIGS. 1B and 1C illustrate graph representations of the content layout of the document illustrated in FIG. 1A, according to an implementation.

DETAILED DESCRIPTION

Figure 1D:
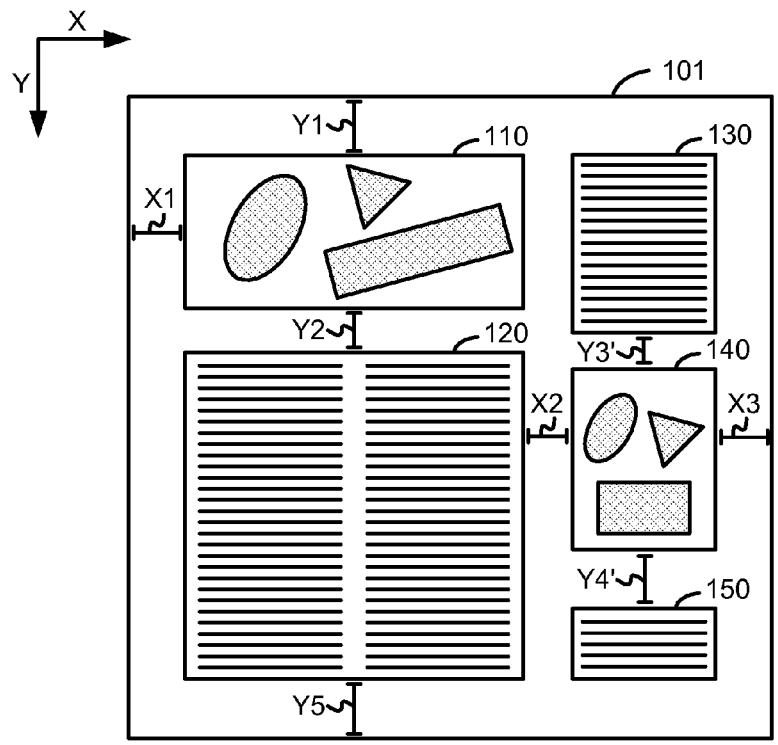
FIGS. 1D and 1E are illustrations of different content layouts of the document illustrated in FIG. 1A, according to different implementations.

Implementations discussed herein define a content layout model for a document template based on designer-provided aesthetics measures (e.g., aesthetics ranking or scoring) for sample documents that conform to the document template and have various content layout parameters. In other words, implementations discussed herein generate a content layout model based on designer input relative to multiple documents—each with a different content layout—that conform to a document template. In some implementations, such content layout models can have multiple dimensions (e.g., a dimension for each content layout parameter of a document template).

Additionally, implementations discussed herein apply a document that conforms to a document template (or a content layout descriptor for the document) to the content layout model for that document template to determine an aesthetics measure of the document. In other words, the content layout of the document is compared to a content layout model to determine whether that document is aesthetically pleasing. That is, the content layout model can be used to predict an aesthetics measure that would be assigned to the document by the designer based on content layouts of documents and the designer-provided aesthetics measures for those documents. Because documents are applied to a content layout model using automated tools (e.g., computing systems hosting a document aesthetics evaluation system rather than human reviewers or designers), large groups of documents can be evaluated economically in terms of cost and time.

The content layout model for a document template relates various content layout parameters of the document template (or of documents conforming to the document template) to the designer-provided aesthetics measures. For example, rather than define or describe an ideal document template, the content layout model describes or models the relationship between content layout parameters and designer-provided aesthetics measures. Such relationships can be expressed in a content layout model as, for example, one or more of a statistical or probabilistic distribution, a variance, a covariance, or a correlation. Moreover, a content layout model can include multiple dimensions (e.g., a dimension corresponding to each content layout parameter of a document template) in which such relationships are defined.

Because such content layout models are derived from or based on designer-provided aesthetics measures for multiple documents (or content layouts), these content layout models can describe phenomena such as multiple content layouts that are equally or nearly equally aesthetically pleasing. Furthermore, because the content layout model is specific to a particular document template and generated from designer-provided aesthetics measures for that particular document template, a content layout model can accommodate or account for aesthetics properties or anomalies in documents conforming to a particular document template that are overlooked or ignored by measures of conformance to generic design principles. For example, a content layout model can accurately reflect that deviations from design principles that are typically not aesthetically pleasing are indeed aesthetically pleasing in documents conforming to a particular document template. As a result, implementations discussed herein can provide enhanced accuracy for determinations or predictions of whether a document is aesthetically pleasing to a designer or other individual.

FIG. 1A is an illustration of the content layout of a document, according to an implementation. Document 100 conforms to a document template that is characterized by content regions and content layout parameters. A document template specifies an arrangement of content (or content regions). For example, the document template to which document 100 conforms specifies five content regions in the general arrangement illustrated in FIG. 1A. More specifically, this document template specifies the existence of content regions 110, 120, 130, 140, and 150, and content layout parameters X1, X2, X3, Y1, Y2, Y3, Y4, and Y5.

Content regions are portions or sections of a document at which content is placed in the document. For example, content such as text, images, figures, graphics, word art, video, or other content can be placed within content regions.

In some implementations, a content region is designated for or assigned a particular class or type of content to identify the type of content that will be placed at or in that content region. For example, one content region of a document can be designated for text content and another content region of the document can be designated for image content. As a specific example, content regions 110 and 140 of document 100 are for graphical content (e.g., images, figures, or other graphics), and content regions 120, 130, and 150 are for text content. In some implementations, a content region can be designated for a group of content types. For example, a content region can be designated for media content types (e.g., video, images, or graphics).

Additionally, content regions can have properties or attributes such as size properties, shape properties, and orientation properties. As illustrated in FIG. 1A, content regions 110, 120, 130, 140, and 150 are rectangles and each have a width and height. In other implementations, content regions can have other shapes such as ellipses, polygons, or other shapes. Similarly, content regions can have size properties other than a height and a width. For example, a content region with an ellipse shape can have one or more radii. In some implementations, content regions can be rotated, flipped, or mirrored, for example, and such orientation operations can be described at orientation properties for the content regions.

Content layout parameters describe the arrangement of content regions of a document. For example, content layout parameters can describe an absolute or relative arrangement of the content regions of a document. In some implementations, content layout parameters can be referred to as features, as aesthetics parameters, as aesthetics features, or using other similar terminology. In the example illustrated in FIG. 1A, content layout parameters X1, X2, and X3 describe the spacing in the X direction of content regions, and content layout parameters Y1, Y2, Y3, Y4, and Y5 describe the spacing in the Y direction of content regions. More specifically, X1 describes the space (or distance) between the left edge of document 100 and content regions 110 and 120; X2 describes the space between content regions 110 and 130, content regions 120 and 140, and content regions 120 and 150; and X3 describes the space between content regions 130, 140, and 150 and the right edge of document 100. Similarly, Y1 describes the space between the top edge of document 100 and content regions 110 and 130; Y2 describes the space between content regions 110 and 120; Y3 describes the space between content regions 130 and 140; Y4 describes the space between content regions 140 and 150; and Y5 describes the space between content regions 120 and 150 and the bottom edge of document 100.

The content layout parameters illustrated in FIG. 1A are relative to a Cartesian coordinate system and are relative to the content regions of document 100. In other implementations, content layout parameters can be relative to other coordinate systems and/or can be absolute with respect to an origin or other point of document 110.

In addition to describing the arrangement of the content regions of a document, the properties or attributes of content regions of a document can also be referred to as content layout parameters. Said differently, values that describe the shape, size, and/or other properties or attributes of content regions are content layout parameters. For example, the width and height of each of content regions 110, 120, 130, 140, and 150 are content layout parameters of document 100.

As discussed above, document 100 conforms to a document template that specifies the existence of content regions 110, 120, 130, 140, and 150, and content layout parameters X1, X2, X3, Y1, Y2, Y3, Y4, and Y5. In other words, the document template specifies the general arrangement of content layout of document 100 (and other documents conforming to the document template), but does not specify specific properties or values of each such content region or content layout parameter.

Moreover, one or more of content regions 110, 120, 130, 140, and 150 (e.g., a size property or shape property of content regions 110, 120, 130, 140, and 150), and content layout parameters X1, X2, X3, Y1, Y2, Y3, Y4, and Y5 of document 100 can be adjusted (e.g., changed, modified, or varied) and document 100 is still said to conform to the document template. That is, a document conforms to a document template if the content regions and content layout parameters specified in the document template exist in or at the document. In some implementations, a document template can specify a first set of content layout parameters (including content layout parameters related to content regions) that should be included or exist in documents that conform to that document template, and can also specify a second set (e.g., a subset of the first set) of content layout parameters that must be included or exist in documents that conform to that document template.

The content layout of document 100 can be described by a content layout descriptor. A content layout descriptor includes a group of content layout parameters that define the arrangement of content within a document. Said differently, a content layout descriptor describes a document relative to the content layout of that document. Accordingly, the content layout descriptor can be referred to as the content layout descriptor for, of, or associated with the document. Moreover, data or information discussed herein as associated with a content layout descriptor can also be said to be associated with the document associated with the content layout descriptor. For example, an aesthetics measure related to a content layout descriptor can also be said to be related to the document associated with the content layout descriptor. Similarly, data or information discussed herein as associated with a document can also be said to be associated with the content layout descriptor for the document. Moreover, in other implementations, content layout descriptors can be referred to using other terms such as "feature vectors" or "aesthetics parameters vectors."

Content layout descriptors can be represented in a variety of forms. For example, a content layout descriptor can be represented as a row in a database table, as a portion of a flat text file, or as an element in an Extensible Markup Language (XML) or other markup document. As another example, FIGS. 1B and 1C illustrate graph representations of the content layout of the document illustrated in FIG. 1A, according to an implementation. The nodes of graphs 191 and 192 represent edges and content regions of document 100, and the edges of 191 and 192 represent space between edges and content regions of document 100. Moreover, the nodes of graphs 191 and 192 that represent content regions of document 100 can include or store content layout parameters related to properties (e.g., size properties such as height and width) of those content regions.

Graph 191 illustrates a vertical (Y direction) component of the content layout descriptor for document 100. More specifically, the root node (labeled "TOP") represents the top edge of document 100, which is separated from each of content regions 110 and 130 (represented by the nodes labeled "110" and "130", respectively) by a space of Y1 (e.g., in pixels, points, inches, centimeters, or some other measure). Content region 110 is separated from content region 120 by Y2. Content region 130 is separated from content region 140 (represented by the node labeled "140") by Y3, and content region 140 is separated from content region 150 (represented by the node labeled "150") by Y4. Content regions 120 and 150 are each separated from the bottom edge of document 100 (represented by the node labeled "BTM") by Y5.

Similarly, graph 192 illustrates a horizontal (X direction) component of the content layout descriptor for document 100. More specifically, the root node (labeled "LFT") represents the left edge of document 100, which is separated from content regions 110 and 120 (represented by the nodes labeled "110" and "120", respectively) by a space of X1 (e.g., in pixels, points, inches, centimeters, or some other measure).

Content region 110 is separated from content region 130 by X2. Content region 120 is also separated from each of content regions 140 and 150 (represented by the nodes labeled "140" and "150", respectively) by X2. Content regions 130, 140, and 150 are each separated from the right edge of document 100 (represented by the node labeled "RGT") by X3.

As discussed above, content regions and content layout parameters specified in a document template can be adjusted for documents conforming to the document template. Accordingly, not all documents conforming to the document template have the same content layout. For example, larger or smaller images or more or less text for particular content regions of a document can results in larger or smaller content regions and/or altered content layout parameters to allow the document to accommodate that content (i.e., the images and text). Because such adjustments alter the content layout and, therefore, the appearance of a document, such adjustments can alter an aesthetics measure of the document (e.g., whether or to what degree the document is aesthetically pleasing).

Figure 1E:
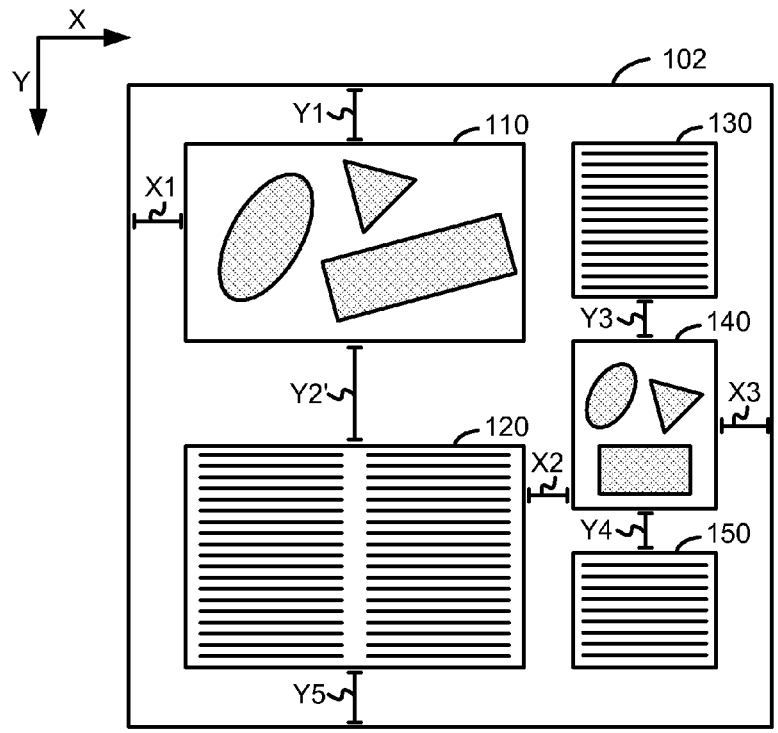

FIGS. 1D and 1E are illustrations of different content layouts of the document illustrated in FIG. 1A, according to different implementations. Document 101 illustrated in FIG. 1D differs from document 100 in the height of content regions 130, 140, and 150, and in the length of Y3' and Y4' in comparison with Y3 and Y4, respectively. Similarly, document 102 differs from document 100 illustrated in FIG. 1A in the height (or length) of content regions 110 and 120, and in the length of Y2' in comparison with Y2.

Figure 2:
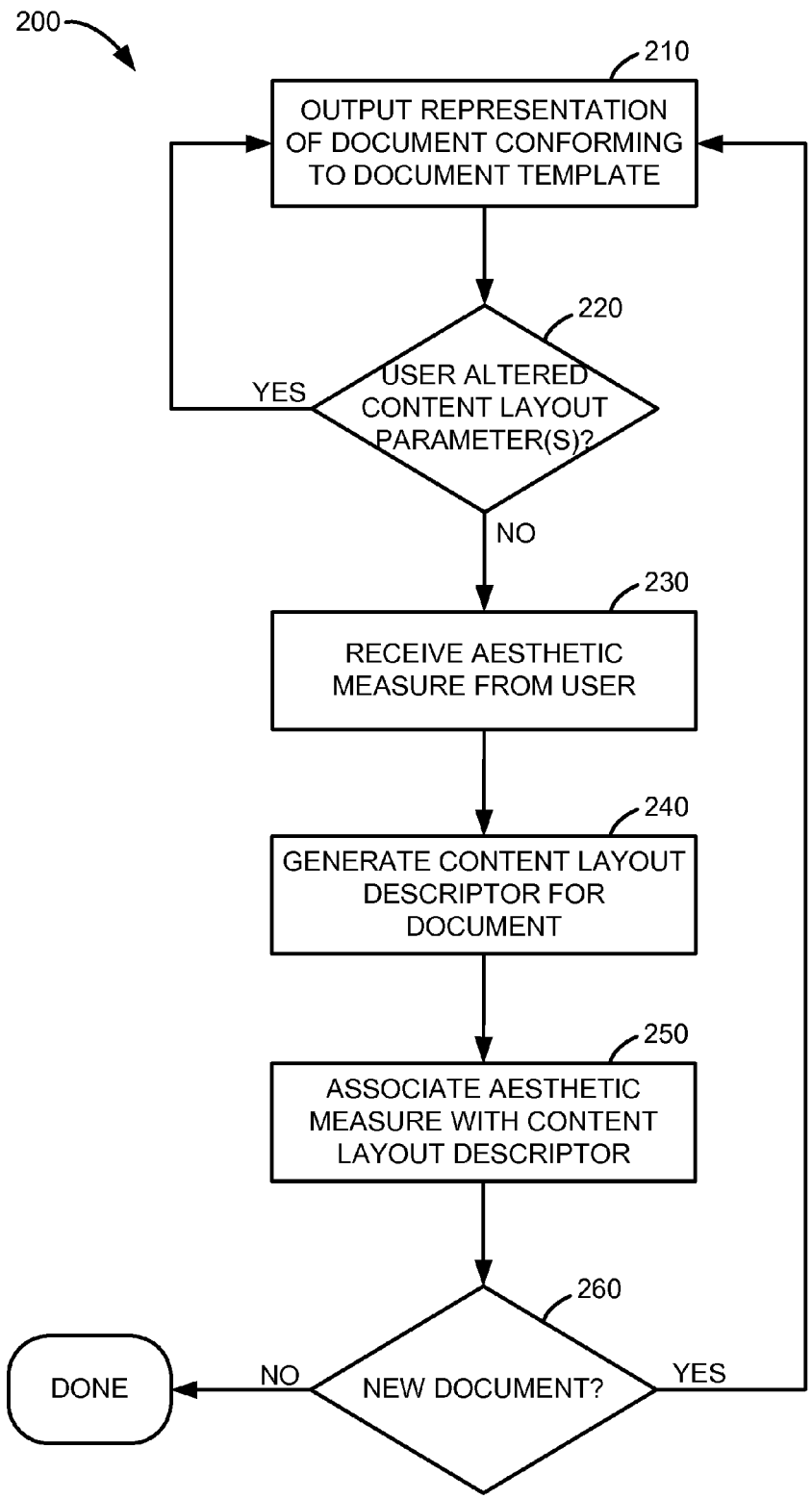
FIG. 2 is a flowchart of a process to associate designer-provided aesthetics measures with documents, according to an implementation.

FIG. 2 is a flowchart of a process to associate designer-provided aesthetics measures with documents, according to an implementation. Process 200 allows a user such as a designer to modify the content layout of a document that conforms to a document template and provide an aesthetics measure (or an aesthetics rank or an aesthetics score) to that document. Additionally, process 200 can be repeated for a number of documents that conform to that document template to allow the user (e.g., designer) to generate a group of content layout descriptors (each of which is related to a particular content layout of a document) with associated aesthetics measures. These content layout descriptors and associated aesthetics measures can be used to define or generate a content layout model for the document template as discussed in more detail in relation to, for example, FIG. 3. Furthermore, as discussed in more detail in relation to, for example, FIGS. 4 and 5, a document aesthetics evaluation system can then use the content layout model for the document template generate aesthetics measures for documents that conform to the document template without additional input from the user (e.g., a designer or other person with the ability to evaluate whether a particular document or content layout of that document is aesthetically pleasing).

A representation of a document conforming to a document template is output at block 210. For example, a document aesthetics evaluation system implementing process 200 can output a representation of the document at a graphical user interface (GUI). As a specific example, a representation of the document similar to illustrations shown in FIGS. 1A, 1D, and 1E (e.g., with rectangular blocks or other shapes to represent content regions). In some implementations, a textual representation of the document can be output at block 210.

The document aesthetics evaluation system implementing process 200 then provides an opportunity for a user such as a designer to alter one or more content layout parameters of the document, and accesses altered content layout parameters at block 220. For example, if the representation of the document is output at a GUI, a designer can manipulate portions of the representation that represent content regions using a mouse or other input device to alter the content layout parameters (or content layout) of the document. More specifically, for example, the user can resize, move, rotate, or otherwise manipulate those portions of the representation using a mouse to alter the content layout of the documents. As the user manipulates the content layout, the document aesthetics evaluation system implementing process 200 accesses (or calculates) altered content layout parameters for the document. In other words, the user is able to alter the content layout parameters of the document by interacting with the representation of the document output at block 210.

In other implementations, the user can provide altered content layout parameters for the document via text-based user interface such as a command line interface (CLI) or at text input boxes or elements of a GUI. That is, the user can input values for content layout parameters to the document aesthetics evaluation system implementing process 200 to alter content layout parameters of the document, and the document aesthetics evaluation system implementing process 200 can access those altered content layout parameters.

If the user altered content layout parameters of the document at block 220, process 200 returns to block 210 and a new representation of the document including the altered content layout parameters is output. In other words, the representation of the document is refreshed. If the user did not alter any content layout parameters, process 200 proceeds to block 230 at which an aesthetics measure is received from the user.

For example, the user can select from a group of aesthetics measures such as values one through five (one being best and five being worst) at a GUI. As an alternative, for example, the user can input an aesthetics measure using a text-based interface (e.g., CLI) or text input element of a GUI. As discussed above, aesthetics measures can be qualitative (e.g., a range of descriptions including bad, tolerable, good, very good, and excellent or values such as one through five representing those qualitative measures) and/or quantitative (e.g., any number between zero and ten).

At block 240, the document aesthetics evaluation system implementing process 200 generates a content layout descriptor for the document. As discussed above, a content layout descriptor includes a group of content layout parameters that define the content layout of the document. For example, the document aesthetics evaluation system implementing process 200 can access the content layout parameters for the document (e.g., spacing between content regions and/or edges of the document and properties or attributes of content regions), and store those content layout parameters in a data structure (i.e., the content layout descriptor) or group of data structures such as the graphs illustrated in FIGS. 1B and 1C. In other implementations, the content layout parameters can be stored as one or more rows in a database, in a table within a memory, or within a file such as an element or object within an XML file. Furthermore, the aesthetics measure received at block 230 is associated with the content layout descriptor at block 250.

The aesthetics measure can be associated with the content layout descriptor using a variety of methodologies. For example, the aesthetics measure can be stored at a field of a data structure at which the content layout descriptor is stored. As another example, a portion of a database or table (e.g., a row or group of rows) at which the content layout descriptor is stored can include a reference or foreign key to another database or table at which the aesthetics measure for the content layout descriptor is stored.

If another or new document conforming to the document template is to be assigned an aesthetics measure, at block 260 process 200 returns to block 210 at which a representation of the new (or next) document is output. Thus, the user is able to provide aesthetics measures for a variety of content layouts in documents conforming to a document template. If no additional document are to be assigned an aesthetics measure, at block 260 process 200 completes.

Process 200 illustrated in FIG. 2 is an example implementation. Other implementations can include more, fewer, or rearranged blocks. For example, in some implementations a content layout descriptor can be generated for a document before an aesthetics measure is received for the document. As another example, an identifier of a document template can be associated with a content layout descriptor. This can be useful, for example, to allow a document aesthetics evaluation system to later access content layout descriptors and aesthetics measures that are related to a particular document template.

Figure 3:
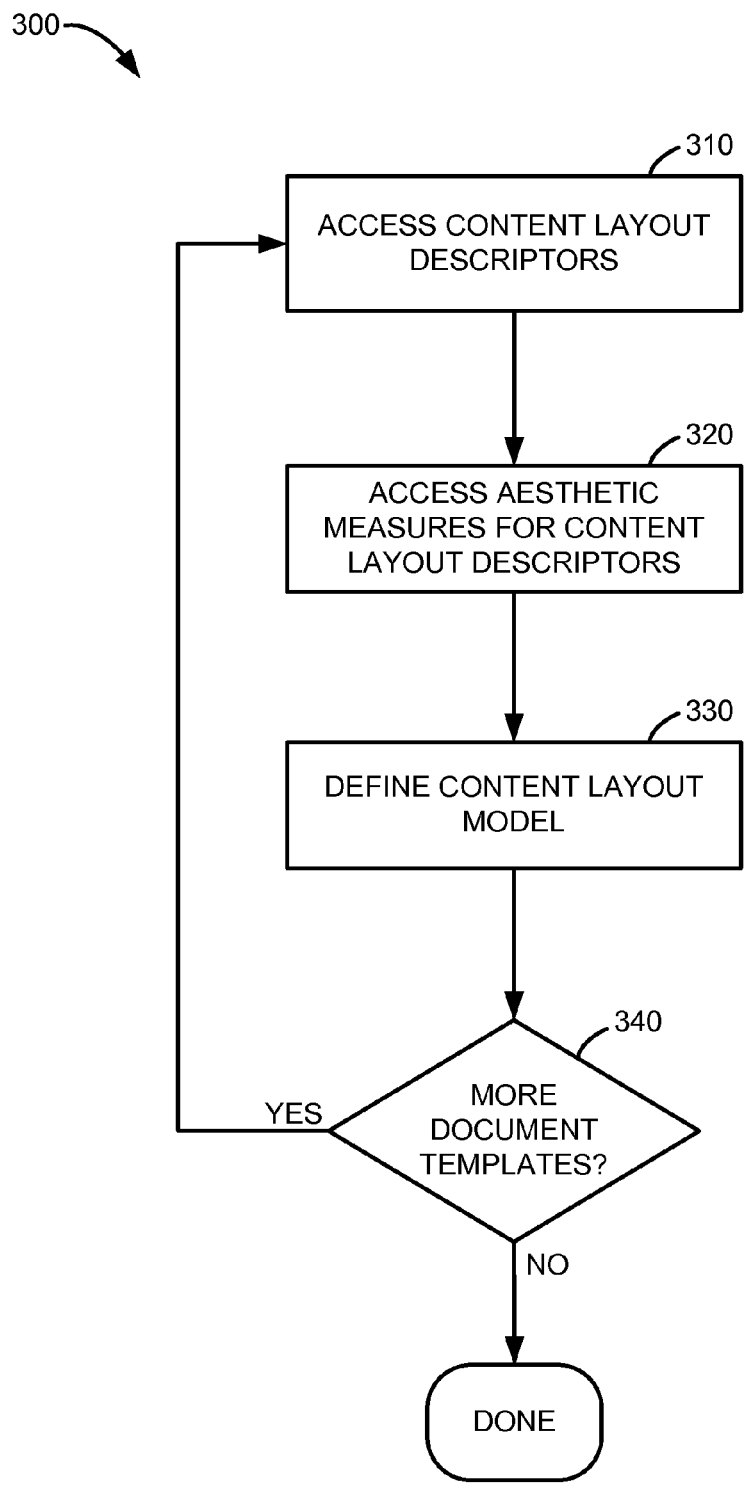
FIG. 3 is a flowchart of a process to define a content layout model, according to an implementation.

FIG. 3 is a flowchart of a process to define a content layout model, according to an implementation. A group of content layout descriptors are accessed at block 310. For example, a group of content layout descriptors based on documents corresponding to a particular document template can be accessed at a database, memory, file, or other data store at block 310. Similarly, aesthetics measures associated with or for those content layout descriptors are accessed at block 320. As discussed above in relation to FIG. 2, such aesthetics measures can be assigned to those content layout descriptors by a designer.

A content layout model for the documents related to the content layout descriptors is then defined or generated at block 330. The content layout model is generated from the content layout descriptors accessed at block 310 and the aesthetics measures accessed at block 320. For example, the content layout parameters included in each content layout descriptor and related aesthetics measures can be analyzed at a document aesthetics evaluation system to identify relationships between content layout parameters and aesthetics measures. Such relationships can then be expressed in various dimensions of a multi-dimensions content layout model. The content layout model can then be used to predict or hypothesize what aesthetics measure the designer would assign a document that conforms to the document template, without input from the designer or another user.

As a more specific example, if the content layout descriptors are related to documents that conform to a particular document template, the content layout model describes or models the relationship between content layout parameters of document described by the content layout descriptors and associated designer-provided aesthetics measures. The content layout model can be defined, for example, by calculating the mean or median of each dimension (e.g., content layout parameter) of the content layout descriptors, and storing those means or medians in a data structure (e.g., within a memory or a file) representing the content layout model.

In some implementations, the content layout parameters of each content layout descriptor can be weighted according to the aesthetics measures before calculating the mean or median of each dimension. For example, a relatively large multiplier can be applied to the content layout parameters of content layout descriptors associated with good or favorable aesthetics measures (e.g., content layout descriptors that represent documents a designer found aesthetically pleasing), and a relatively small multiplier can be applied to the content layout parameters of content layout descriptors associated with poor or unfavorable aesthetics measures. Such weighting can skew the content layout model (e.g., skew the mean or median, which can also be referred to as a weighted mean or median, for each dimension of the content layout model) for each dimension towards the content layout parameters (or towards the values of the content layout parameters) that were included in content layout descriptors with favorable aesthetics measures.

The content layout model defined at block 330 can then be stored, for example, at a data structure within a memory, at a database, at an XML document, at a file, or at some other data store. If another content layout model should be defined (e.g., for another document template) at block 340, process 300 returns to block 310. If no additional content layout models should be defined at block 340, process 300 completes.

Similar to FIG. 2, process 300 illustrated in FIG. 3 is an example implementation. Other implementations can include more, fewer, or rearranged blocks. For example, aesthetics measures can be accessed before content layout descriptors, or process 300 can not include block 340 such that only one content layout model is generated. As another example, similar to content layout descriptors discussed above in relation to FIG. 2, the content layout model defined at block 330 can be stored (e.g., at a data store such as a database or at a memory) for later use by a document aesthetics evaluation system. Moreover, a content layout model can include an identifier of a document template or group of content layout parameters to which the content layout model applies.

Referring again to block 330, an as a specific example of defining a content layout model based on content layout descriptors and associated designer-provided aesthetics measures, a cost function can be minimized using the content layout descriptors and the associated designer-provided aesthetics measures to define a mean and covariance between the content layout parameters of the content layout descriptors for documents conforming to a document template. More specifically, the cost function $$\mathrm{argmin}_{\Sigma, \overline{\theta}} \|2 \log r_i - (\theta_i - \overline{\theta})^T \Sigma^{-1} (\theta_i - \overline{\theta})\|, \text{ where}$$

$\overline{\theta}$ is a mean vector, $\Sigma$ is a covariance matrix, and $\theta_i$ is a vector of content layout parameters for a particular (i.e., the $i^{th}$) document, and $r_i$ is an aesthetics measure for that document, can be used to generate a content layout model that describes relationships among content layout parameters and aesthetics measures. In other words, a group of documents that conform to a document template are each characterized by a vector $\theta_i$ (e.g., a feature vector) which includes content layout parameters for that document. $\theta_i$ is, therefore, the content layout descriptor of the $i^{th}$ document (i.e., a vector with values that correspond to the content layout parameters of the $i^{th}$ document), and $r_i$ is the designer-provided aesthetics measure associated with that document. In this example, each $r_i$ has a value of 1, 2, 3, 4, or 5, where 1 indicates the best aesthetics measure of the content layout of a document and 5 indicates the worst aesthetics measure of the content layout of a document. In other words, here, the aesthetics measure associated with each content layout descriptor is a non-exclusive rank. $\overline{\theta}$ and $\Sigma$ collectively define a content layout model, which, in this example, is a Gaussian distribution characterized by mean $\overline{\theta}$ and covariance $\Sigma$.

A mean vector $\overline{\theta}_j$ and covariance matrix $\Sigma_j$ for each group of content layout descriptors with a common (i.e., the same) aesthetics measure can be determined as follows:

$$\overline{\theta}_j = \frac{1}{N_j} \sum_{k=1}^{N_j} \theta_{j,k} \text{ and } \sum_j = \frac{1}{N_j} \sum_{k=1}^{N_j} (\theta_{j,k} - \overline{\theta}_j)(\theta_{j,k} - \overline{\theta}_j)^T,$$

where $N_j$ is the number of content layout descriptors in the $j^{th}$ group and $\theta_{j,k}$ is the $k^{th}$ content layout descriptor in the $j^{th}$ group. Said differently, $\bar{\theta}_j$ is determined for each possible aesthetics measure value (here, 1, 2, 3, 4, and 5) by summing each content layout descriptor $\theta_i$ with the other content layout descriptors that have the same aesthetics measure value as $r_i$, and dividing the result by the number of content layout descriptors that were for that aesthetics measure value. $\Sigma_j$ is similarly determined for each group of content layout descriptors with a common aesthetics measure.

Mean $\bar{\theta}$ and covariant matrix $\Sigma$ can then be determined as follows:

$$\bar{\theta} = (\Sigma_{j=1}^{5} \Sigma_j^{-1} N_j)^{-1} (\Sigma_{j=1}^{5} \Sigma_{k=1}^{N_j} \Sigma_j^{-1} \theta_{j,k}) \text{ and}$$
$$\Sigma = (\Sigma_{j=1}^{5} \Sigma_j^{-1} N_j)^{-1}.$$

In some implementations, a weight for each distinct aesthetics measure value (here, 1, 2, 3, 4, and 5) can be applied to mean $\bar{\theta}$ and covariant matrix $\Sigma$ to compensate for, correct for, or remove a bias due to a large number of content layout descriptors with poor (here, high) aesthetics measures. In such implementations, mean $\bar{\theta}$ and covariant matrix $\Sigma$ can then be determined as follows:

$$\bar{\theta} = (\Sigma_{j=1}^{5} w_j \Sigma_j^{-1} N_j)^{-1} (\Sigma_{j=1}^{5} \Sigma_{k=1}^{N_j} w_j \Sigma_j^{-1} \theta_{j,k}) \text{ and}$$
$$\Sigma = (\Sigma_{j=1}^{5} w_j \Sigma_j^{-1} N_j)^{-1}.$$

The value of the weights $w_1$, $w_2$, $w_3$, $w_4$, and $w_5$ are determined using the cost function from above. More specifically, the weights can be determined using a linear equation of the form $S\,w = R$, where:

$$S = \begin{bmatrix} (\theta_1 - \bar{\theta})^T \Sigma_1^{-1}(\theta_1 - \bar{\theta}) & \cdots & (\theta_1 - \bar{\theta})^T \Sigma_5^{-1}(\theta_1 - \bar{\theta}) \\ \vdots & \ddots & \vdots \\ (\theta_N - \bar{\theta})^T \Sigma_1^{-1}(\theta_N - \bar{\theta}) & \cdots & (\theta_N - \bar{\theta})^T \Sigma_5^{-1}(\theta_N - \bar{\theta}) \end{bmatrix},$$

where N is the number of content layout descriptors, $$w = \begin{bmatrix} w_1 \\ w_2 \\ w_3 \\ w_4 \\ w_5 \end{bmatrix}, \text{ and } R = \begin{bmatrix} 2\log r_1 \\ \vdots \\ 2\log r_N \end{bmatrix}.$$

More specifically, the weights (included in w) can be determined by taking the pseudo-inverse of the matrix S and multiplying it to the vector R of scaled aesthetics measures (ranks). This can be expressed as:

$$w = (S^T S)^{-1} S^T R.$$

The cost function is then minimized as discussed below. An initial or candidate mean $\bar{\theta}$ is selected. For example, the unweighted mean $$\bar{\theta} = \left( \sum_{j=1}^{5} \Sigma_j^{-1} N_j \right)^{-1} \left( \sum_{j=1}^{5} \sum_{k=1}^{N_j} \Sigma_j^{-1} \theta_{j,k} \right)$$

can be used as the initial mean $\bar{\theta}$. As another example, a content layout descriptor $\theta_j$ or a mean $\bar{\theta}_j$ from the means for a group of content layout descriptors with a common aesthetics measure value can be selected as the initial mean.

After the initial mean is selected, the following steps are repeated, with the mean $\bar{\theta}$ calculated in one iteration of the following steps being used in the subsequent iteration of the following steps. The weights are calculated using $w = (S^T S)^{-1} S^T R$. Those weights are then used to determine $\Sigma$ for $\Sigma = (\Sigma_{j=1}^{5} w_j \Sigma_j^{-1} N_j)^{-1}$, and $\bar{\theta}$ for $\bar{\theta} = (\Sigma_{j=1}^{5} w_j \Sigma_j^{-1} N_j)^{-1} (\Sigma_{j=1}^{5} \Sigma_{k=1}^{N_j} w_j \Sigma_j^{-1} \theta_{j,k})$. These steps (i.e., solving for w, $\Sigma$, and $\bar{\theta}$) are repeated until $\Sigma$ and $\bar{\theta}$ converge. That is, these steps are repeated until $\Sigma$ and $\bar{\theta}$ determined during the current iteration of the steps is not significantly different from $\Sigma$ and $\bar{\theta}$ determined during the previous iteration of the steps.

The difference that is significant can vary according to different implementations and precision requirements. For example, the steps above can be repeated until $\Sigma$ and $\bar{\theta}$ determined during the current iteration of the steps differ from $\Sigma$ and $\bar{\theta}$ determined during the previous iteration of the steps by no more than 1%. In another implementation, the steps above can be repeated until $\Sigma$ and $\bar{\theta}$ determined during the current iteration of the steps differ from $\Sigma$ and $\bar{\theta}$ determined during the previous iteration of the steps by 1%-5%.

After mean $\bar{\theta}$ and covariant matrix $\Sigma$ have converged, mean $\bar{\theta}$ and covariant matrix $\Sigma$ are the content layout model for the document template to which the documents represented by the content layout descriptors $\theta_i$. More specifically, mean $\bar{\theta}$ and covariant matrix $\Sigma$ define a Gaussian distribution (with dimensions corresponding to the content layout parameters included in documents that conform to that document template), where the mean corresponds with content layout descriptors with better (here, lower) aesthetics measures. Content layout descriptors of other documents conforming to that document template can then be compared with this Gaussian distribution to determine whether those documents are likely to be aesthetically pleasing to a designer (such as the designer who provided the aesthetics measures for the content layout descriptors $\theta_i$), or to predict what aesthetics measure a designer would assign to those documents.

Figure 4:
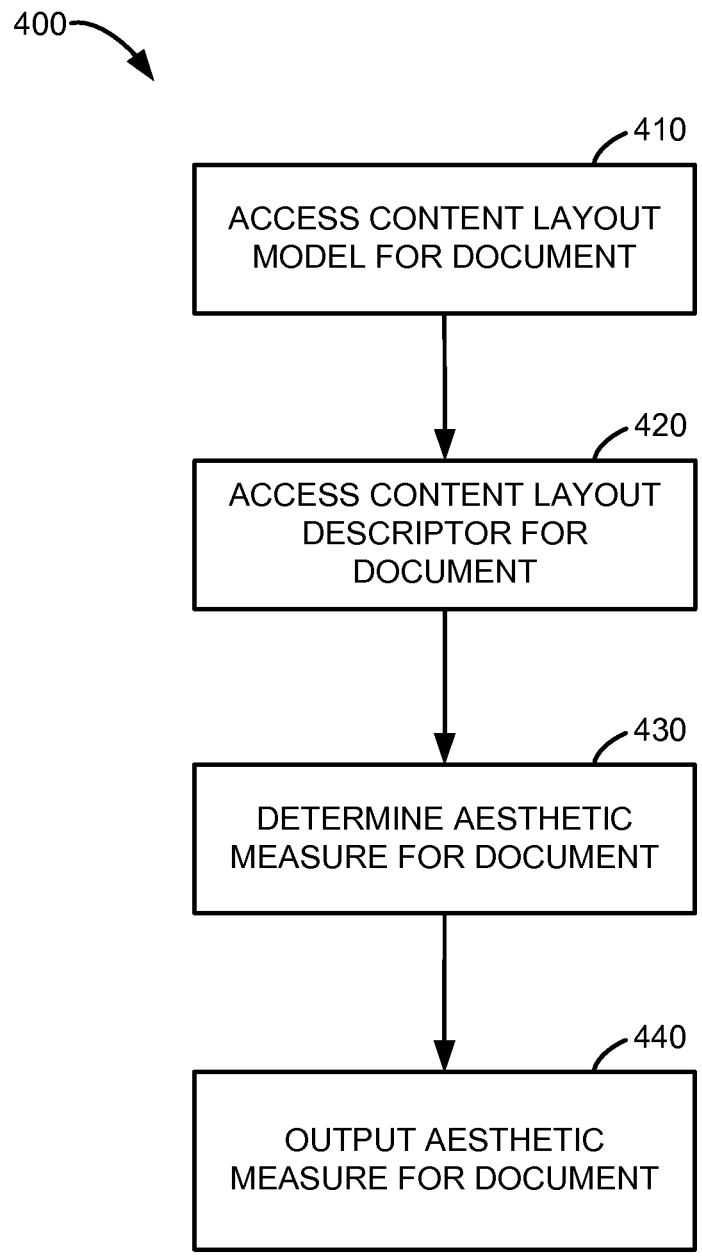
FIG. 4 is a flowchart of a process to determine an aesthetics measure for a document, according to an implementation.

In other words, the content layout model for the document template can be used to determine aesthetics measures for documents that have not been assigned an aesthetics measure by a designer. FIG. 4 is a flowchart of a process to determine an aesthetics measure for a document, according to an implementation. A content layout model for a document is accessed at block 410. For example, a content layout model associated with a document template to which the document conforms can be accessed at a data store such as a database.

A content layout descriptor for the document is then accessed at block 420. In some implementations, the content layout descriptor for the document can be provided as an input to a document aesthetics evaluation system implementing process 400. In other implementations, a document aesthetics evaluation system implementing process 400 can access the content layout descriptor for the document at a data store. In yet other implementations, a document aesthetics evaluation system implementing process 400 can receive the document as input, and can identify or access content layout parameters of the document (e.g., based on metadata or markup information within the document and/or image processing techniques such as edge detection), and generate a content layout descriptor for the document.

An aesthetics measure for the document is determined at block 430 by comparing the content layout descriptor accessed at block 420 with the content layout model accessed at block 410. In other words, the content layout descriptor accessed at block 420 is applied to the content layout model accessed at block 410 to determine an aesthetics measure for the document. As discussed above, a content layout model can include multiple dimensions, such as a dimension for each content layout parameter of a document template. Accordingly, in many implementations, the content layout descriptor accessed at block 420 is similarly expressed in multiple dimensions (e.g., a dimension for each content layout parameter of a the content layout parameter), and the content layout descriptor can be efficiently applied to the content layout model using matrix operations at a document aesthetics evaluation system hosted at a computing system.

For example, as discussed above, the content layout model can be a statistical or probabilistic distribution with dimensions corresponding to the content layout parameters for a document template. The content layout parameters of a content layout descriptor for a document conforming to the document template can be applied to the distribution to determine whether that content layout descriptor is close to the mean of the distribution, and, therefore, likely to be aesthetically pleasing. The aesthetics measure of that content layout descriptor (or the document represented by that content layout descriptor) can be determined based on its proximity to the mean (or other portion of the distribution) and other features (e.g., a variance, a covariance, or a standard deviation) of the distribution.

In some implementations, the type of aesthetics measure determined at block 430 is different than the type of aesthetics measure used to generate a content layout model. For example, as discussed above, the aesthetics measure used to generate a content layout model can be a rank, and the aesthetics measure determined at block 330 is binary—aesthetically pleasing or not aesthetically pleasing. Alternatively, for example, the aesthetics measure determined at block 330 can be a value within a range such as one to ten, or binary—aesthetically pleasing or not aesthetically pleasing—with an associated confidence score.

The aesthetics measure of the document is then output at block 440. For example, the aesthetics measure can be output to a user interface such as a GUI to inform a user of a document aesthetics evaluation system implementing process 400 whether a document is aesthetically pleasing. In some implementations, process 400 can output the aesthetics measure to a file.

Figure 5:
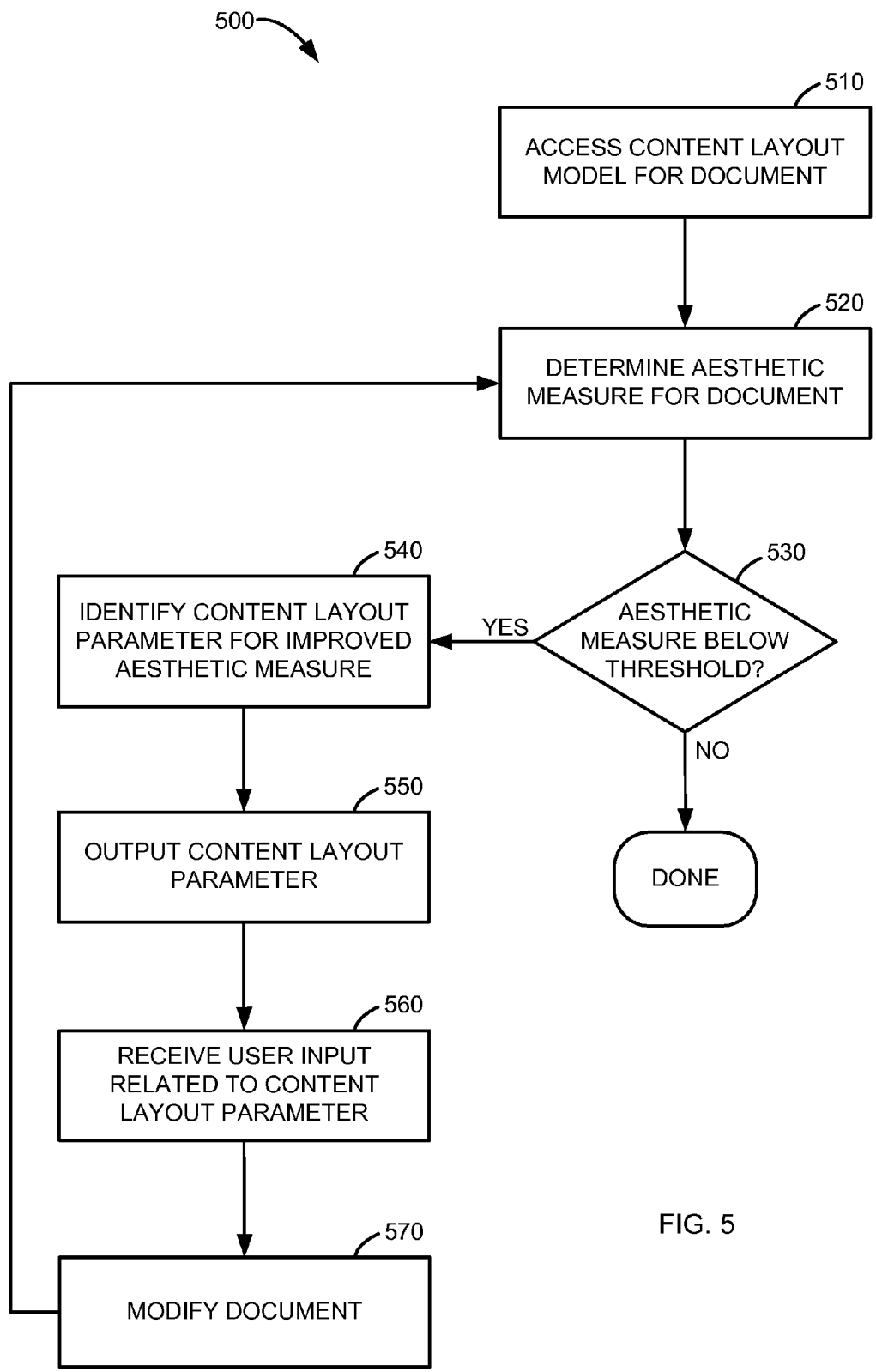
FIG. 5 is a flowchart of a process to determine an aesthetics measure for a document, according to an implementation.

FIG. 5 is a flowchart of a process to determine an aesthetics measure for a document, according to an implementation. Similar to blocks 410 and 430 discussed above, a content layout model for a document is accessed at block 510 and is used to determine an aesthetics measure for the document at block 520. If the aesthetics measure is above a threshold (e.g., a predefined or user-provided threshold) associated with a worst acceptable aesthetics measure, process 500 completes. For example, process 500 can output the aesthetics measure for the document.

If, however, the aesthetics measure is below the threshold, process 500 proceeds to block 540 at which one or more content layout parameters that can be altered to improve the aesthetics measure. In other words, For example, referring to the content layout model based on a Gaussian distribution discussed above, one or more content layout parameters of the document that significantly deviate from the mean of the distribution can be identified. Information related to the identified one or more content layout parameters is then output at block 550 to prompt a user to alter the document to change the one or more content layout parameters.

For example, a portion of the document related to such a content layout parameter can be highlighted or otherwise noted at a representation of the document output at a GUI of a document aesthetics evaluation system implementing process 500. As another example, a text description of such a content layout parameter and/or its current value can be output at block 550.

User input relative to the one or more content layout parameters is received at block 560. For example, user input indicating that a user has moved (e.g., using a mouse and a GUI) one or more content regions related to the one or more content layout parameters can be received at block 560. In other implementations, user input including a new value for the one or more content layout parameters is received at block 560. Although not illustrated in FIG. 5, in some implementations, the user input can indicate that the user does not desire to change the document, and process 500 can complete.

If the user input to alter the one or more content layout parameters is received at block 560, a document aesthetics evaluation system implementing process 500 can modify the document at 570 based on the altered one or more content layout parameters. In other words, the document aesthetics evaluation system implementing process 500 can modify the document at 570 based on the user input to improve the aesthetics measure of the document. Process 500 then returns to block 520 to determine a new aesthetics measure for the document after the document is modified.

Figure 6:
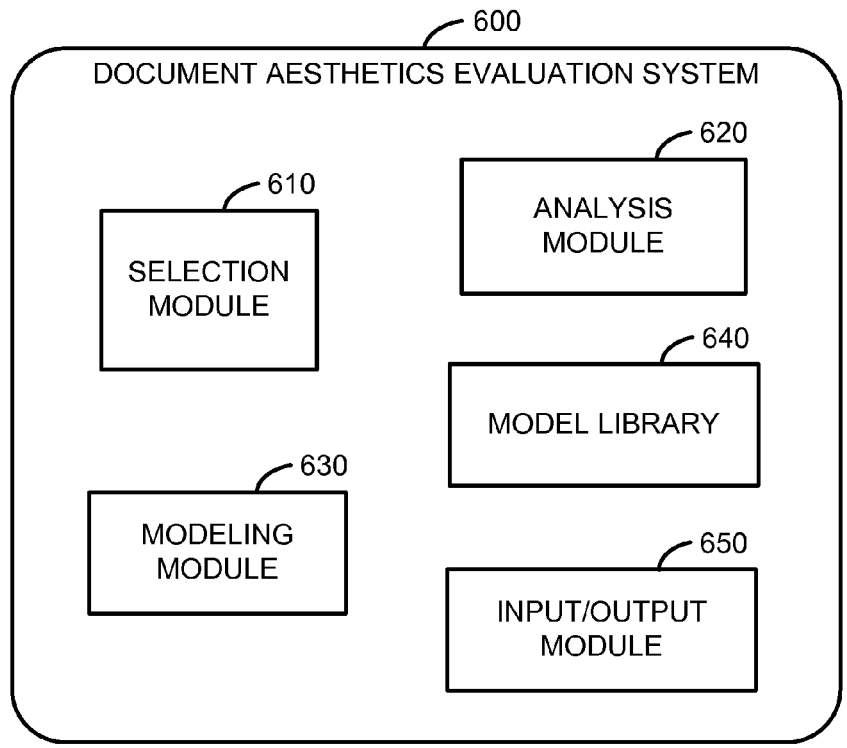
FIG. 6 is a schematic block diagram of a document aesthetics evaluation system, according to an implementation.

FIG. 6 is a schematic block diagram of a document aesthetics evaluation system, according to an implementation. Although various modules (i.e., combinations of hardware and software) are illustrated and discussed in relation to FIG. 6 and other example implementations, other combinations or sub-combinations of modules can be included within other implementations. Said differently, although the modules illustrated in FIG. 6 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Document aesthetics evaluation system 600 includes selection module 610, analysis module 620, modeling module 630, model library 640, and input/output module 640. Selection module 610 selects a content layout model for a document. For example, document aesthetics evaluation system can receive documents or content layout descriptors representing content layout of documents and identifiers of document templates to which those documents conform. Selection module 610 can then select a content layout model associated with that document template.

As a specific example, selection module 610 can select a content layout model at model library 640. Content model library 640 includes a variety of content layout models, and can be a data store such as a database or a file or group of files. In some implementations, model library 640 is included within document aesthetics evaluation system 600. In other implementations, model library 640 is separate from document aesthetics evaluation system 600.

Analysis module 620 compares a document (or a content layout descriptor representing content layout of the document) with a content layout model selected at selection module 610 for that document to generate or determine an aesthetics measure for that document. As a specific example, the content layout model can be a statistical or probabilistic distribution with dimensions corresponding to the content layout parameters of the document template to which the document conforms, and analysis module 620 determines the proximity of a content layout descriptor for the document to the mean of that distribution. The aesthetics measure is then determined based on that proximity. For example, if the content layout descriptor is within a first distance from the mean, a best aesthetics measure is generated by analysis module 620; if the content layout descriptor is within a second distance from the mean, a good aesthetics measure is generated by analysis module 620; and if the content layout descriptor is within a third distance from the mean, a bad or poor aesthetics measure is generated by analysis module 620.

Input/output module 650 receives and processes user input, and generates output for document aesthetics evaluation system 600. For example, input/output module 650 can receive user input relative to changes to a document (or representation of a document output by input/output module 650), a document or content layout descriptor for a document, and/or other input. Additionally, input/output module 650 can output representations of documents, aesthetics measures, or other information. As a specific example, input/output module 650 can implement process 200 discussed above in relation to FIG. 2 to generate content layout descriptors and associate aesthetics measures with those content layout descriptors.

In some implementations, input/output module 650 defines a web-based (e.g., using the Hypertext Transfer Protocol (HTTP)) interface for document aesthetics evaluation system 600. Thus, document aesthetics evaluation system 600 can be accessed via an Internet or web browser application at a computing system. In other implementations, input/output module 650 communicates with drivers or an input/output framework or application programming interface (API) of an operating system at a computing system hosting document aesthetics evaluation system 600 and the operating system.

Modeling module 630 defines a content layout model based on a plurality of content layout descriptors and a plurality of aesthetics measures. For example, in some implementations, modeling module 630 can implement process 300 discussed above in relation to FIG. 3. As another specific example, referring to the content layout model based on a Gaussian distribution discussed above, modeling module 630 can define a statistical or probabilistic distribution based on a plurality of content layout descriptors and a plurality of aesthetics measures that is used at document aesthetics evaluation system 600 as a content layout model.

Figure 7:
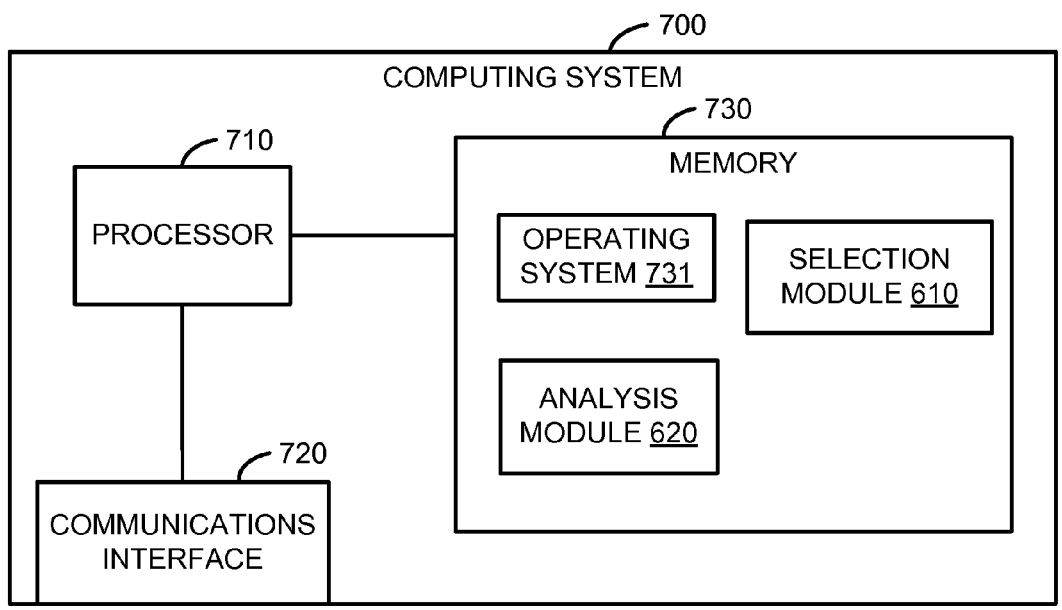
FIG. 7 is a schematic block diagram of a computing system configured as a document aesthetics evaluation system, according to an implementation.

FIG. 7 is a schematic block diagram of a computing system configured as a document aesthetics evaluation system, according to an implementation. Computing system 700 (e.g., a desktop computer, a notebook computer, a computer server, a group of computer servers, a virtual machine, a group of virtual machines, or a combination thereof) includes processor 710, communications interface 720, and memory 730. Processor 710 is any combination of hardware and software that executes or interprets instructions, codes, or signals. For example, processor 710 can be a microprocessor, an application-specific integrated circuit (ASIC), a distributed processor such as a cluster or network of processors or computing systems, a multi-core or multi-processor processor, or a virtual or logical processor of a virtual machine.

Communications interface 720 is a module via which processor 710 can communicate with other processors or computing systems via communications link. For example, communications interface 720 can include a network interface card and a communications protocol stack hosted at processor 710 (e.g., instructions or code stored at memory 730 and executed or interpreted at processor 710 to implement a network protocol). As specific examples, communications interface 720 can be a wired interface, a wireless interface, an Ethernet interface, a Fiber Channel interface, an InfiniBand interface, and IEEE 802.11 interface, or some other communications interface via which processor 710 can exchange signals or symbols representing data to communicate with other processors or computing systems. For example, computing system 700 can host a document aesthetics evaluation system that includes an input/output module implanting a web-based interface that communicates with client (e.g., web browsers) via communications interface 720.

Memory 730 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 730 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. In some implementations, memory 730 can be integrated with processor 710, separate from processor 710, or external to computing system 700.

Memory 730 includes modules (e.g., instructions or codes) that when executed at processor 710 implement operating system 731, selection module 610 and analysis module 620. In other words, operating system 731, selection module 610 and analysis module 620 are each modules that—when executed at processor 710—cause processor 710 to perform operations that implement, respectively, an operating system and a document aesthetics evaluation system including a selection module and an analysis module. Said differently, operating system 731, selection module 610 and analysis module 620 are hosted at computing system 700 (or at processor 710). In some implementations, other modules such as modules included within document aesthetics evaluation system 600 illustrated at FIG. 6 are also hosted at computing system 700.

In some implementations, computing system 700 can be a virtualized computing system. For example, computing system 700 can be hosted as a virtual machine at a computing server. Moreover, in some implementations, computing system 700 can be a virtualized computing appliance, and operating system 731 is a minimal or just-enough operating system to support (e.g., provide services such as a communications protocol stack and access to components of computing system 700 such as communications interface 730) a document aesthetics evaluation system including selection module 610 and analysis module 620.

Selection module 610 and analysis module 620 can be accessed or installed at computing system 700 from a variety of memories or processor-readable media. For example, computing system 700 can access a remote processor-readable medium via communications interface 720 and selection module 610 and analysis module 620 at that processor-readable medium. As a specific example, computing system 700 can be a thin client that accesses operating system 731, selection module 610, and analysis module 620 during a boot sequence.

As another example, computing system 700 can include (not illustrated in FIG. 7) a processor-readable medium access device (e.g., CD, DVD, SD, MMC, or a CF drive or reader) and selection module 610 and analysis module 620 at a processor-readable medium via that processor-readable medium access device. As a more specific example, the processor-readable medium access device can be a DVD drive at which a DVD including an installation package for selection module 610 and analysis module 620 is accessible. The installation package can be executed or interpreted at processor 710 to install selection module 610 and analysis module 620 at computing system 700 (e.g., at memory 730). Computing system 710 can then host or execute a document aesthetics evaluation system including selection module 610 and analysis module 620.

In some implementations, a document aesthetics evaluation system including selection module 610 and analysis module 620 (and/or other components or modules of the document aesthetics evaluation system) can be accessed at or installed from multiple sources, locations, or resources. For example, some components or modules of the document aesthetics evaluation system can be installed via a communications link, and other components or modules of the document aesthetics evaluation system can be installed from a DVD.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "module" is intended to mean one or more modules or a combination of modules.

Moreover, the term "provide" as used herein includes push mechanism (e.g., sending data independent of a request for that data), pull mechanisms (e.g., delivering data in response to a request for that data), and store mechanisms (e.g., storing data at an intermediary at which the data can be accessed). Furthermore, as used herein, the term "based on" means "based at least in part on." Thus, a feature that is described as based on some cause, can be based only on the cause, or based on that cause and on one or more other causes.

What is claimed is:

1. A non-transitory machine-readable storage medium storing instructions that when executed cause a system including a processor to:
    access a plurality of content layout descriptors associated with a document template, wherein each of the content layout descriptors is generated for a respective different document of a plurality of documents and includes a group of content layout parameters;
    access a plurality of aesthetics measures, each aesthetics measure from the plurality of aesthetics measures assigned by a user to a respective content layout descriptor from the plurality of content layout descriptors; and
    generate a statistical content layout model for the document template based on the plurality of content layout descriptors and the plurality of aesthetics measures, the statistical content layout model relating content layout parameters to the aesthetics measures, the content layout parameters of the statistical content layout model being based on statistical measures derived from the content layout parameters of the content layout descriptors.

2. The non-transitory machine-readable storage medium of claim 1, further comprising instructions that when executed cause the system to:
    receive a document;
    determine that the received document conforms to the document template;
    access the statistical content layout model for the document template, in response to the determining; and
    determine an aesthetics measure for the received document based on the accessed statistical content layout model and a content layout descriptor associated with the received document.

3. The non-transitory machine-readable storage medium of claim 1, further comprising instructions that when executed cause the system to:
    determine an aesthetics measure based on the statistical content layout model and a given content layout descriptor associated with a given document;
    output the aesthetics measure and a prompt to modify the given document;
    modify at least one content layout parameter of the given content layout descriptor in response to user input that is responsive to the prompt; and
    in response to the modifying of the at least one content layout parameter, modify the given document to improve the aesthetic measure for the given document.

4. The non-transitory machine-readable storage medium of claim 1, further comprising instructions that when executed cause the system to:
    receive a document; and
    determine an aesthetics measure based on comparing a content layout descriptor associated with the received document and the statistical content layout model.

5. The non-transitory machine-readable storage medium of claim 1, wherein the plurality of content layout descriptors include a first content layout descriptor and a second content layout descriptor and the plurality of aesthetics measures include a first aesthetics measure and a second aesthetics measure,
    the non-transitory machine-readable medium further comprising instructions that when executed cause the system to:
    output a representation of a first document conforming to the document template, the first content layout descriptor based on the first representation;
    output a representation of a second document conforming to the document template, the second content layout descriptor based on the second representation;
    associate the first aesthetics measure with the first content layout descriptor in response to user input; and
    associate the second aesthetics measure with the second content layout descriptor in response to user input.

6. The non-transitory machine-readable storage medium of claim 1, wherein the content layout parameters of the statistical content layout model include a parameter relating to a space between content regions and a parameter relating to a size of a content region.

7. The non-transitory machine-readable storage medium of claim 1, further comprising instructions that when executed cause the system to:
    output a representation of a first of the plurality of documents for display;
    receive user modification of at least one content layout parameter, the user modification responsive to the output representation;
    receive a first of the plurality of aesthetics measures provided by the user for the first document; and
    generate a first of the plurality of content layout descriptors based on the modified at least one content layout parameter.

8. The non-transitory machine-readable storage medium of claim 7, wherein the user modification of the at least one content layout parameter alters a placement of a content region within the document template.

9. The non-transitory machine-readable storage medium of claim 7, wherein the user modification of the at least one content layout parameter alters a size of a content region within the document template.

10. The non-transitory machine-readable storage medium of claim 1, wherein the statistical measures comprise a collection of mean values computed based on the content layout parameters of the content layout descriptors.

11. The non-transitory machine-readable storage medium of claim 10, wherein the statistical measures further comprise a collection of variance values computed based on the content layout parameters of the content layout descriptors.

12. The non-transitory machine-readable storage medium of claim 1, wherein deriving the statistical measures comprises:
    calculating a first collection of statistical measures based on the content layout parameters of a first subset of the plurality of content layout descriptors, the content layout descriptors of the first subset each assigned a first of the plurality of aesthetic measures; and
    calculating a second collection of statistical measures based on the content layout parameters of a second subset of the plurality of content layout descriptors, the content layout descriptors of the second subset each assigned a second of the plurality of aesthetic measures.

13. A system, comprising:
    at least one processor;
    a selection module executable on the at least one processor to select, for a given document, a statistical content layout model from a plurality of statistical content layout models at a model library, the plurality of statistical content layout models corresponding to respective different document templates, and the given document conforming to a document template, from among the document templates, that is uniquely associated with the selected content layout model, and each of the plurality of statistical content layout models characterizing a statistical distribution modeling a respective relationship between content layout parameters describing content layouts of a plurality of documents with user-provided aesthetics measures of the plurality of documents; and
    an analysis module executable on the at least one processor to determine an aesthetics measure for the given document based on the selected statistical content layout model and a content layout descriptor associated with the given document, the content layout descriptor including a group of content layout parameters.

14. The system of claim 13, wherein each statistical content layout model from the plurality of statistical content layout models is based on a plurality of content layout descriptors for the respective plurality of documents and a plurality of aesthetics measures assigned to the plurality of content layout descriptors.

15. The system of claim 13, further comprising:
    a modeling module executable on the at least one processor to define each statistical content layout model from the plurality of content layout models based on a plurality of content layout descriptors for the respective plurality of documents and a plurality of aesthetics measures.

16. The system of claim 13, further comprising:
    the model library including the plurality of statistical content layout models.

17. The system of claim 13, wherein each of the statistical content layout models includes content layout parameters based on statistical measures derived from content layout parameters of a respective group of content layout descriptors.

18. The system of claim 17, wherein the statistical measures comprise a collection of mean values computed based on the content layout parameters of the group of content layout descriptors.

19. The system of claim 18, wherein the statistical measures further comprise a collection of variance values computed based on the content layout parameters of the group of content layout descriptors.

20. A method comprising:
    accessing, by a system including a processor, a plurality of content layout descriptors associated with a document template, wherein each of the content layout descriptors is generated for a respective different document of a plurality of documents and includes a group of content layout parameters;
    accessing, by the system, a plurality of aesthetics measures, each aesthetics measure from the plurality of aesthetics measures assigned by a user to a respective content layout descriptor from the plurality of content layout descriptors; and
    generating, by the system, a statistical content layout model for the document template based on the plurality of content layout descriptors and the plurality of aesthetics measures, the statistical content layout model relating content layout parameters to the aesthetics measures, the content layout parameters of the statistical content layout model based on statistical measures derived from the content layout parameters of the content layout descriptors.

21. The method of claim 20, further comprising:
    outputting a representation of a first of the plurality of documents for display;
    receiving user modification of at least one content layout parameter, the user modification responsive to the output representation;
    receiving a first of the plurality of aesthetics measures provided by the user for the first document; and
    generating a first of the plurality of content layout descriptors based on the modified at least one content layout parameter.

22. The method of claim 21, wherein the user modification of the at least one content layout parameter alters placement of a content region within the document template or alters a size of a content region within the document template.

23. The method of claim 20, further comprising:
    receiving a document; and
    determining an aesthetics measure based on comparing a content layout descriptor associated with the received document and the content layout model.

24. The method of claim 20, wherein the statistical measures comprise a collection of mean values computed based on the content layout parameters of the content layout descriptors.

25. The method of claim 24, wherein the statistical measures further comprise a collection of variance values computed based on the content layout parameters of the content layout descriptors.

26. A method comprising:

selecting, for a given document by a system including a processor, a statistical content layout model from a plurality of statistical content layout models, the plurality of statistical content layout models corresponding to respective different document templates, and the given document conforming to a document template, from among the document templates, that is uniquely associated with the selected content layout model, and each of the plurality of statistical content layout models characterizing a statistical distribution modeling a respective relationship between content layout parameters describing content layouts of a plurality of documents with user-provided aesthetics measures of the plurality of documents; and determining, by the system, an aesthetics measure for the given document based on the selected statistical content layout model and a content layout descriptor associated with the given document, the content layout descriptor including a group of content layout parameters.

27. The method of claim 26, wherein each of the statistical content layout models includes content layout parameters based on statistical measures derived from content layout parameters of a respective group of content layout descriptors.

* * * * *